United States Patent
Chen

(10) Patent No.: US 10,580,366 B2
(45) Date of Patent: Mar. 3, 2020

(54) LIQUID CRYSTAL DISPLAY DEVICE AND DRIVE METHOD THEREFOR

(71) Applicants: HKC CORPORATION LIMITED, Shenzhen (CN); CHONGQING HKC OPTOELECTRONICS TECHNOLOGY CO., LTD., Chongqing (CN)

(72) Inventor: Yu-Jen Chen, Chongqing (CN)

( * ) Notice: Subject to any disclaimer, the term of this patent is extended or adjusted under 35 U.S.C. 154(b) by 0 days.

(21) Appl. No.: 16/309,936

(22) PCT Filed: Dec. 27, 2017

(86) PCT No.: PCT/CN2017/118919
§ 371 (c)(1),
(2) Date: Dec. 14, 2018

(87) PCT Pub. No.: WO2018/121586
PCT Pub. Date: Jul. 5, 2018

(65) Prior Publication Data
US 2019/0310521 A1 Oct. 10, 2019

(30) Foreign Application Priority Data
Dec. 27, 2016 (CN) .......................... 2016 1 1229076

(51) Int. Cl.
*G02F 1/1335* (2006.01)
*G09G 3/34* (2006.01)
(Continued)

(52) U.S. Cl.
CPC ......... *G09G 3/3413* (2013.01); *G02F 1/1368* (2013.01); *G02F 1/13306* (2013.01);
(Continued)

(58) Field of Classification Search
CPC ............ G02F 1/13452; G02F 1/13454; G02F 1/13306; G02F 1/133611; G02F 1/1368;
(Continued)

(56) References Cited

U.S. PATENT DOCUMENTS

2011/0032231 A1 2/2011 Maruyama et al.
2011/0267381 A1* 11/2011 Yamazaki ............ G09G 3/3413
345/690
(Continued)

FOREIGN PATENT DOCUMENTS

CN 102103840 A 6/2011
CN 103456257 A 12/2013
(Continued)

OTHER PUBLICATIONS

International Search Report dated Mar. 23, 2018 in the corresponding PCT application (application No. PCT/CN2017/118919).

*Primary Examiner* — Abbas I Abdulselam
(74) *Attorney, Agent, or Firm* — Kilpatrick Townsend & Stockton, LLP

(57) ABSTRACT

The present disclosure relates to a drive method of a liquid crystal display device, including: displaying each picture sequentially by using two frames of images, where two adjacent sub-pixels on each frame of image have a high drive voltage and a low drive voltage; determining a backlight lightness adjustment signal of each backlight subarea according to drive voltages of a first frame of image area and a second frame of image area corresponding to each backlight subarea and a first frame of image area and a second frame of image area corresponding to backlight subareas adjacent to the backlight subarea; and performing independent lightness adjustment on a backlight source of various types of the color sub-pixels in a corresponding backlight subarea in each frame of image of a next picture according
(Continued)

to the backlight lightness adjustment signal of each backlight subarea.

20 Claims, 4 Drawing Sheets

(51) Int. Cl.
    *G02F 1/133*     (2006.01)
    *G09G 3/20*     (2006.01)
    *G02F 1/1368*     (2006.01)
    *G09G 3/36*     (2006.01)
    *G02F 1/1345*     (2006.01)

(52) U.S. Cl.
    CPC ...... *G02F 1/13452* (2013.01); *G02F 1/13454* (2013.01); *G02F 1/133602* (2013.01); *G02F 1/133611* (2013.01); *G09G 3/2003* (2013.01); *G09G 3/3426* (2013.01); *G09G 3/3607* (2013.01); *G09G 3/3648* (2013.01); *G09G 3/3666* (2013.01); *G02F 1/133621* (2013.01); *G02F 2001/133601* (2013.01); *G09G 2300/0426* (2013.01); *G09G 2300/0452* (2013.01); *G09G 2310/08* (2013.01); *G09G 2320/028* (2013.01); *G09G 2320/0233* (2013.01); *G09G 2320/0247* (2013.01); *G09G 2320/0285* (2013.01); *G09G 2320/066* (2013.01); *G09G 2320/0626* (2013.01); *G09G 2320/0646* (2013.01); *G09G 2360/16* (2013.01)

(58) Field of Classification Search
    CPC .. G09G 3/3607; G09G 3/3413; G09G 3/3666; G09G 2320/0646
    See application file for complete search history.

(56) References Cited

U.S. PATENT DOCUMENTS

| | | |
|---|---|---|
| 2014/0225877 A1 | 8/2014 | Nakanishi et al. |
| 2016/0275843 A1 | 9/2016 | Shin et al. |
| 2017/0193931 A1* | 7/2017 | Han ............ G09G 3/3266 |

FOREIGN PATENT DOCUMENTS

| | | |
|---|---|---|
| CN | 104821180 A | 8/2015 |
| CN | 105047142 A | 11/2015 |
| CN | 105733549 A | 7/2016 |
| CN | 106782377 A | 5/2017 |

* cited by examiner

First frame          Second frame

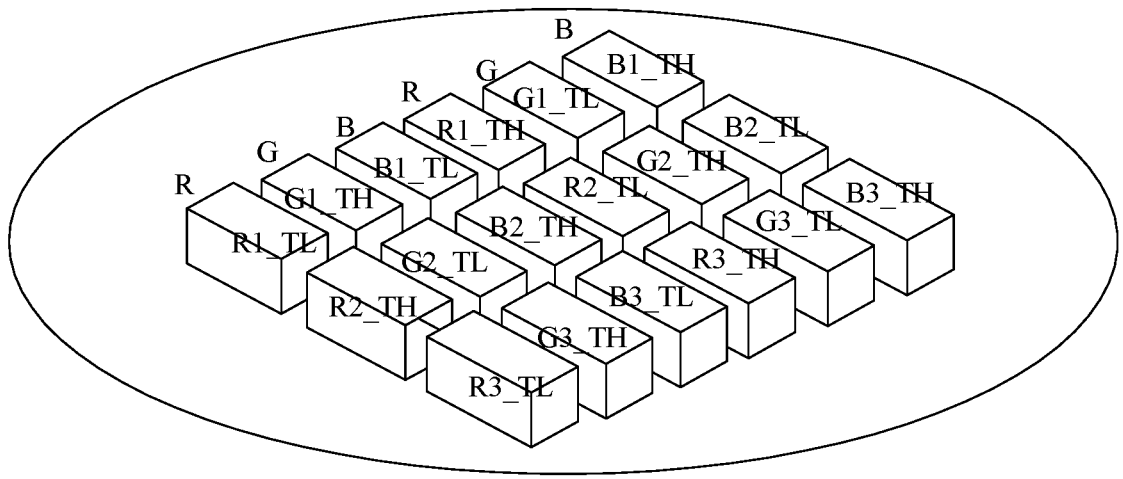

FIG. 5

| Collect statistics of an average drive voltage of various types of the color sub-pixels in the first frame of image area and the second frame of image area corresponding to each backlight subarea and the first frame of image area and the second frame of image area corresponding to the Backlight subareas adjacent to upper, lower, left, and right sides of the backlight subarea | S210 |

| Acquire a backlight lightness adjustment signal according to the drive voltage, a reference backlight brightness signal, and a reference drive voltage of a first frame of image area and a second frame of image area corresponding to each backlight subarea and a first frame of image area and a second frame of image area corresponding to backlight subareas adjacent to upper, lower, left, and right sides of the backlight subarea | S220 |

FIG. 6

LIQUID CRYSTAL DISPLAY DEVICE AND DRIVE METHOD THEREFOR

FILED

The present disclosure relates to the field of liquid crystal display technologies, and more particularly relates to a liquid crystal display device and a drive method therefor.

BACKGROUND

A conventional large-size liquid crystal display device mostly uses a negative VA type liquid crystal or IPS liquid crystal technology. The lightness of a VA type liquid crystal driver is rapidly saturated with a drive voltage in a large viewing angle, causing a relatively serious viewing angle color shift, further affecting image quality.

SUMMARY

In view of this, it is necessary to provide a liquid crystal display device and a drive method of the liquid crystal display device, to overcome a disadvantage of a viewing angle color shift.

A drive method of a liquid crystal display device includes: displaying each picture sequentially by using two frames of images, where the two frames of images include a first frame of image and a second frame of image; two adjacent sub-pixels on each frame of image have a high drive voltage and a low drive voltage, and each sub-pixel has a high drive voltage and a low drive voltage in the first frame of image and the second frame of image; determining a backlight lightness adjustment signal of each backlight subarea according to drive voltages of a first frame of image area and a second frame of image area corresponding to each backlight subarea and a first frame of image area and a second frame of image area corresponding to backlight subareas adjacent to a first direction, a second direction, a third direction, and a fourth direction of the backlight subarea, where the backlight lightness adjustment signal is signals in groups and a quantity of groups is the same as a quantity of types of color sub-pixels; and performing independent lightness adjustment on a backlight source of various types of the color sub-pixels in a corresponding backlight subarea of each frame of image of a next picture according to the backlight lightness adjustment signal of each backlight subarea.

In the foregoing drive method of a liquid crystal display device, each picture is displayed sequentially by using two frames of images, each frame of image is driven by using high and low voltage signals at intervals, high and low drive voltages of the first frame of image and the second frame of image are reversed, and the backlight lightness adjustment signal of the next picture is generated according to each drive voltage, to perform independent backlight adjustment on a backlight source of various types of the color sub-pixels in the corresponding backlight subarea in each frame of image of the next picture, to reduce a visible flicker and discomfort phenomenon caused by a switching difference of high and low voltages during driving, thereby effectively overcoming a disadvantage of a color shift caused by mismatching of a refractive index of the liquid crystal display device in the large viewing angle.

In an embodiment, the drive voltage of each sub-pixel of the first frame of image and the second frame of image is obtained by searching a look up table according to an input signal of each picture.

In an embodiment, the step of determining a backlight lightness adjustment signal of each backlight subarea according to drive voltages of a first frame of image area and a second frame of image area corresponding to each backlight subarea and a first frame of image area and a second frame of image area corresponding to backlight subareas adjacent to a first direction, a second direction, a third direction, and a fourth direction of the backlight subarea includes: collecting statistics of the drive voltages of the first frame of image area and the second frame of image area corresponding to each backlight subarea and the first frame of image area and the second frame of image area of the backlight subareas adjacent to the first direction, the second direction, the third direction, and the fourth direction of the backlight subarea; and acquiring the backlight lightness adjustment signal according to an average drive voltage, a reference backlight lightness signal, and a reference drive voltage of each backlight subarea.

In an embodiment, in the step of acquiring the backlight lightness adjustment signal according to an average drive voltage, a reference backlight lightness signal, and a reference drive voltage of each backlight subarea and the backlight subareas adjacent to the first direction, the second direction, the third direction, the fourth direction of the backlight subarea, calculation formulas for the backlight lightness adjustment signal of each type of the color sub-pixel in each backlight subarea are as follows: $A_{M\_P1}*P_{M\_ave1}=A_{M\_P2}*P_{M\_ave2}$; and $2*A_{M\_P}*P_{M\_ave}=A_{M\_P1}*P_{M\_ave1}+A_{M\_P2}*P_{M\_ave2}$, wherein P represents a target color sub-pixel; M represents a sequence number of the backlight subarea and the backlight subareas adjacent to the first direction, the second direction, the third direction, and the fourth direction of the backlight subarea; $A_{M\_P1}$ represents the backlight lightness adjustment signal used to perform backlight lightness adjustment on the backlight source of a P sub-pixel in the backlight subarea corresponding to the first frame of image of a next picture and in the backlight subareas M adjacent to the first direction, the second direction, the third direction, and the fourth direction of the backlight subarea; $A_{M\_P2}$ represents the backlight lightness adjustment signal used to perform the backlight lightness adjustment on the backlight source of the P sub-pixel in the backlight subarea corresponding to the second frame of image of the next picture and in the backlight subareas M adjacent to the first direction, the second direction, the third direction, and the fourth direction of the backlight subarea; $P_{M\_ave1}$ represents an average value of drive voltages of the P sub-pixel in the backlight subarea corresponding to the first frame of image of a current picture and in the backlight subareas M adjacent to the first direction, the second direction, the third direction, and the fourth direction of the backlight subarea; $P_{M\_ave2}$ represents an average value of drive voltages of the P sub-pixel in the backlight subarea corresponding to the second frame of image of the current picture and in the backlight subareas M adjacent to the first direction, the second direction, the third direction, and the fourth direction of the backlight subarea; $A_{M\_P}$ represents the reference backlight lightness signal of the P sub-pixel in the backlight subarea corresponding to the image of the current picture and in the backlight subareas M adjacent to the first direction, the second direction, the third direction, and the fourth direction of the backlight subarea; and $P_{M\_ave}$ represents an average value of reference drive voltages of the P sub-pixel in a frame pattern area corresponding to the backlight subarea and the backlight subareas M adjacent to the first direction, the second direction, the third direction, and the fourth direction of the backlight subarea on the image of the current picture.

In an embodiment, types of the color sub-pixel type on each frame of image includes at least a red sub-pixel, a green sub-pixel, and a blue sub-pixel; and the backlight lightness adjustment signal includes a red sub-pixel backlight adjustment signal, a green sub-pixel backlight adjustment signal, and a blue sub-pixel backlight adjustment signal, to perform independent backlight adjustment on various types of the color sub-pixels.

A liquid crystal display device includes a display component and a backlight component, where the backlight component is divided into multiple backlight subareas, and the liquid crystal display device further includes: a drive component, connected to the display component, and configured to display each picture sequentially by using two frames of images, where the two frames of images include a first frame of image and a second frame of image, two adjacent sub-pixels on each frame of image have a high drive voltage and a low drive voltage, and each sub-pixel has a high drive voltage and a low drive voltage in the first frame of image and the second frame of image; a backlight control component, connected to the drive component, where the backlight control component is configured to determine a backlight lightness adjustment signal of each backlight subarea according to drive voltages of a first frame of image area and a second frame of image area corresponding to each backlight subarea and a first frame of image area and a second frame of image area corresponding to backlight subareas adjacent to a first direction, a second direction, a third direction, and a fourth direction of the backlight subarea, where the backlight lightness adjustment signal is signals in groups and a quantity of groups is the same as a quantity of types of color sub-pixels; and a backlight adjustment component, connected to the backlight control component and the backlight component respectively, where the backlight adjustment component is configured to perform independent lightness adjustment on a backlight source of various types of the color sub-pixels in a corresponding backlight subarea of each frame of image of a next picture according to the backlight lightness adjustment signal of each backlight subarea.

In an embodiment, a storage component is further included, where the storage component is configured to store a look up table; the look up table is a correspondence table of an input signal and a drive voltage of each sub-pixel in the first frame of image and the second frame of image corresponding to the input signal; and the drive component obtains the drive voltage of each sub-pixel in the first frame of image and the second frame of image by using the look up table.

In an embodiment, the backlight control component includes: a statistics collecting unit, configured to collect statistics of an average drive voltage of various types of the color sub-pixels in the first frame of image area and the second frame of image area corresponding to each backlight subarea; and a calculation unit, configured to acquire the backlight lightness adjustment signal according to the average drive voltage, a reference backlight lightness signal, and a reference drive voltage of each backlight subarea.

In an embodiment, calculation formulas used by the calculation unit to acquire the backlight lightness adjustment signal of each type of the color sub-pixel in each backlight subarea are as follows: $A_{M\_P1}*P_{M\_ave1}=A_{M\_P2}*P_{M\_ave2}$; and $2*A_{M\_P}*P_{M\_ave}=A_{M\_P1}*P_{M\_ave1}+A_{M\_P2}*P_{M\_ave2}$, where P represents a target color sub-pixel; M represents a sequence number of the backlight subarea and the backlight subareas adjacent to the first direction, the second direction, the third direction, and the fourth direction of the backlight subarea; $A_{M\_P1}$ represents the backlight lightness adjustment signal used to perform backlight lightness adjustment on the backlight source of a P sub-pixel in the backlight subarea corresponding to the first frame of image of a next picture and in the backlight subareas M adjacent to the first direction, the second direction, the third direction, and the fourth direction of the backlight subarea; $A_{M\_P2}$ represents the backlight lightness adjustment signal used to perform the backlight lightness adjustment on the backlight source of the P sub-pixel in the backlight subarea corresponding to the second frame of image of the next picture and in the backlight subareas M adjacent to the first direction, the second direction, the third direction, and the fourth direction of the backlight subarea; $P_{M\_ave1}$ represents an average value of drive voltages of the P sub-pixel in the backlight subarea corresponding to the first frame of image of a current picture and in the backlight subareas M adjacent to the first direction, the second direction, the third direction, and the fourth direction of the backlight subarea; $P_{M\_ave2}$ represents an average value of drive voltages of the P sub-pixel in the backlight subarea corresponding to the second frame of image of the current picture and in the backlight subareas M adjacent to the first direction, the second direction, the third direction, and the fourth direction of the backlight subarea; $A_{M\_P}$ represents the reference backlight lightness signal of the P sub-pixel in the backlight subarea corresponding to the image of the current picture and in the backlight subareas M adjacent to the first direction, the second direction, the third direction, and the fourth direction of the backlight subarea; and $P_{M\_ave}$ represents an average value of reference drive voltages of the P sub-pixel in a frame pattern area corresponding to the backlight subarea and the backlight subareas M adjacent to the first direction, the second direction, the third direction, and the fourth direction of the backlight subarea on the image of the current picture.

In an embodiment, the backlight source is a white light backlight source, an RGB backlight source, an RGBW backlight source, or an RGBY backlight source.

A drive method of a liquid crystal display device includes: displaying each picture sequentially by using two frames of images, where the two frames of images include a first frame of image and a second frame of image; two adjacent sub-pixels on each frame of image have a high drive voltage and a low drive voltage, and each sub-pixel has a high drive voltage and a low drive voltage in the first frame of image and the second frame of image; determining a backlight lightness adjustment signal of each backlight subarea according to an adjustment parameter, where the backlight lightness adjustment signal is signals in groups and a quantity of groups is the same as a quantity of types of color sub-pixels; and performing independent lightness adjustment on a backlight source of various types of the color sub-pixels in a corresponding backlight subarea of each frame of image of a next picture according to the backlight lightness adjustment signal.

In an embodiment, the drive voltage of each sub-pixel of the first frame of image and the second frame of image is obtained by searching a look up table according to an input signal of each picture.

In an embodiment, the step of determining a backlight lightness adjustment signal of each backlight subarea according to an adjustment parameter includes: collecting statistics of an average drive voltage that is calculated according to the adjustment parameter and that is of various types of the color sub-pixels in the first frame of image area and the second frame of image area corresponding to each backlight subarea; and acquiring the backlight lightness adjustment signal according to the average drive voltage, a reference backlight lightness signal, and a reference drive voltage of each backlight subarea.

In an embodiment, in the step of acquiring the backlight lightness adjustment signal according to the average drive voltage calculated according to the adjustment parameter, a reference backlight lightness signal, and a reference drive voltage of each backlight subarea, calculation formulas for the backlight lightness adjustment signal of each type of the color sub-pixel in each backlight subarea are as follows:

$$A_{M\_P1}*P_{M\_ave1}=A_{M\_P2}*P_{M\_ave2};$$

and $$2*A_{M\_P}*P_{M\_ave}=A_{M\_P1}*P_{M\_ave1}+A_{M\_P2}*P_{M\_ave2},$$

where P represents a target color sub-pixel; M represents a sequence number of the backlight subarea acquired according to the adjustment parameter; AM_P1 represents the backlight lightness adjustment signal used to perform backlight lightness adjustment on the backlight source of a P sub-pixel in the backlight subarea corresponding to a first frame of image of a next picture and in the sequence number of the backlight subarea M acquired according to the adjustment parameter; AM_P2 represents the backlight lightness adjustment signal used to perform the backlight lightness adjustment on the backlight source of the P sub-pixel in the backlight subarea corresponding to the second frame of image of the next picture and in the sequence number of the backlight subarea M acquired according to the adjustment parameter; PM_ave1 represents an average value of drive voltages of the P sub-pixel in the backlight subarea corresponding to the first frame of image of a current picture and in the sequence number of the backlight subarea M acquired according to the adjustment parameter; PM_ave2 represents an average value of drive voltages of the P sub-pixel in the backlight subarea corresponding to the second frame of image of the current picture and in the sequence number of the backlight subarea M acquired according to the adjustment parameter; AM_P represents the reference backlight lightness signal of the P sub-pixel in the backlight subarea corresponding to the image of the current picture and in the sequence number of the backlight subarea M acquired according to the adjustment parameter; and PM_ave represents an average value of reference drive voltages of the P sub-pixel in a frame pattern area corresponding to the backlight subarea and the sequence number of the backlight subarea M acquired according to the adjustment parameter of the backlight subarea on the image of the current picture.

In an embodiment, types of the color sub-pixel type on each frame of image includes at least a red sub-pixel, a green sub-pixel, and a blue sub-pixel; and the backlight lightness adjustment signal includes a red sub-pixel backlight adjustment signal, a green sub-pixel backlight adjustment signal, and a blue sub-pixel backlight adjustment signal, to perform independent backlight adjustment on various types of the color sub-pixels.

In an embodiment, the adjustment parameter is determined according to the drive voltages of a first frame of image area and a second frame of image area corresponding to each backlight subarea and the first frame of image area and the second frame of image area of the backlight subarea adjacent to a first direction of the backlight subarea.

In an embodiment, the adjustment parameter is determined according to drive voltages of the first frame of image area and a second frame of image area corresponding to each backlight subarea and the first frame of image area and the second frame of image area of the backlight subarea adjacent to a second direction of the backlight subarea.

In an embodiment, the adjustment parameter is determined according to the drive voltages of a first frame of image area and a second frame of image area corresponding to each backlight subarea and the first frame of image area and the second frame of image area of the backlight subarea adjacent to a third direction of the backlight subarea.

In an embodiment, the adjustment parameter is determined according to drive voltages of a first frame of image area and a second frame of image area corresponding to each backlight subarea and a first frame of image area and a second frame of image area of a backlight subarea adjacent to a fourth direction of the backlight subarea.

In an embodiment, the adjustment parameter is determined according to the drive voltages of a first frame of image area corresponding to each backlight subarea and the first frame of image area of the backlight subarea adjacent to a fourth direction of the backlight subarea.

BRIEF DESCRIPTION OF THE DRAWINGS

FIG. 4 and FIG. 5 are partial enlarged views in FIG. 3.

FIG. 6 is a specific flowchart of step S120 in FIG. 1.

DETAILED DESCRIPTION OF THE INVENTION

To make the objectives, technical solutions, and advantages of the present disclosure clearer and more comprehensible, the present disclosure will be further described in detail below with reference to the accompanying drawings and embodiments. It should be understood that the specific embodiments described herein are merely used to explain the present disclosure but are not intended to limit the present disclosure.

Figure 1:
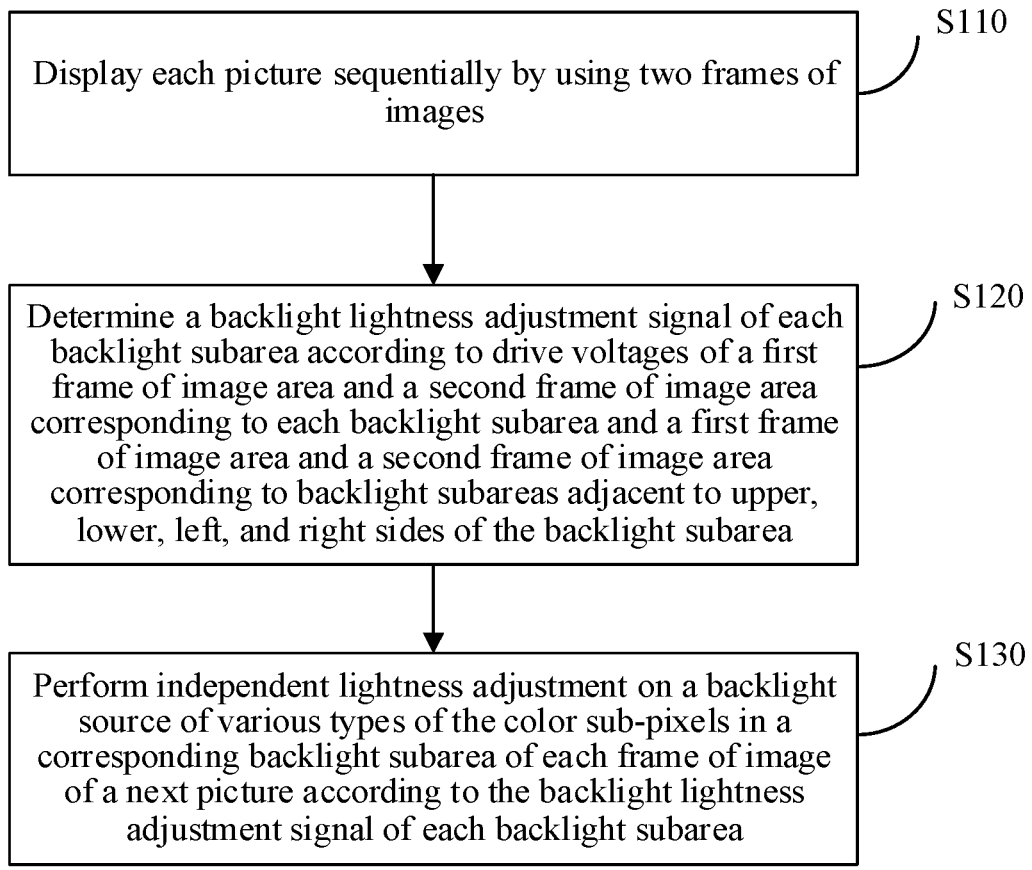
FIG. 1 is a flowchart of a drive method of a liquid crystal display device in an embodiment.
Figure 2:
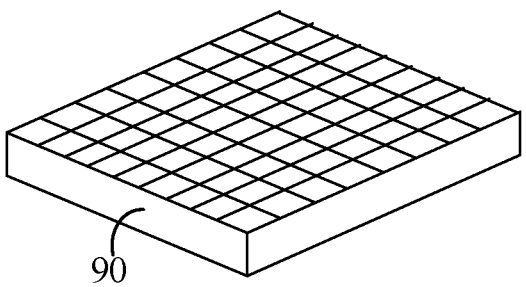
FIG. 2 is a schematic diagram of dividing a backlight area of the liquid crystal display device in FIG. 1.

FIG. 1 is a flowchart of a drive method of a liquid crystal display device in an embodiment. The liquid crystal display device may be a TN, OCB, VA type, or curved liquid crystal display device, but is not limited thereto. The liquid crystal display device may use direct-light type backlight, and a backlight source may be a white light source, an RGB light source, an RGBW light source, or an RGBY light source, but is not limited thereto. In this embodiment, a backlight area of the liquid crystal display device is divided into multiple backlight subareas, as shown in FIG. 2. In FIG. 2, 90 represents a backlight component (or a backlight module).

Referring to FIG. 1, the method includes the following steps:

S110, display each picture sequentially by using two frames of images.

Figure 3:
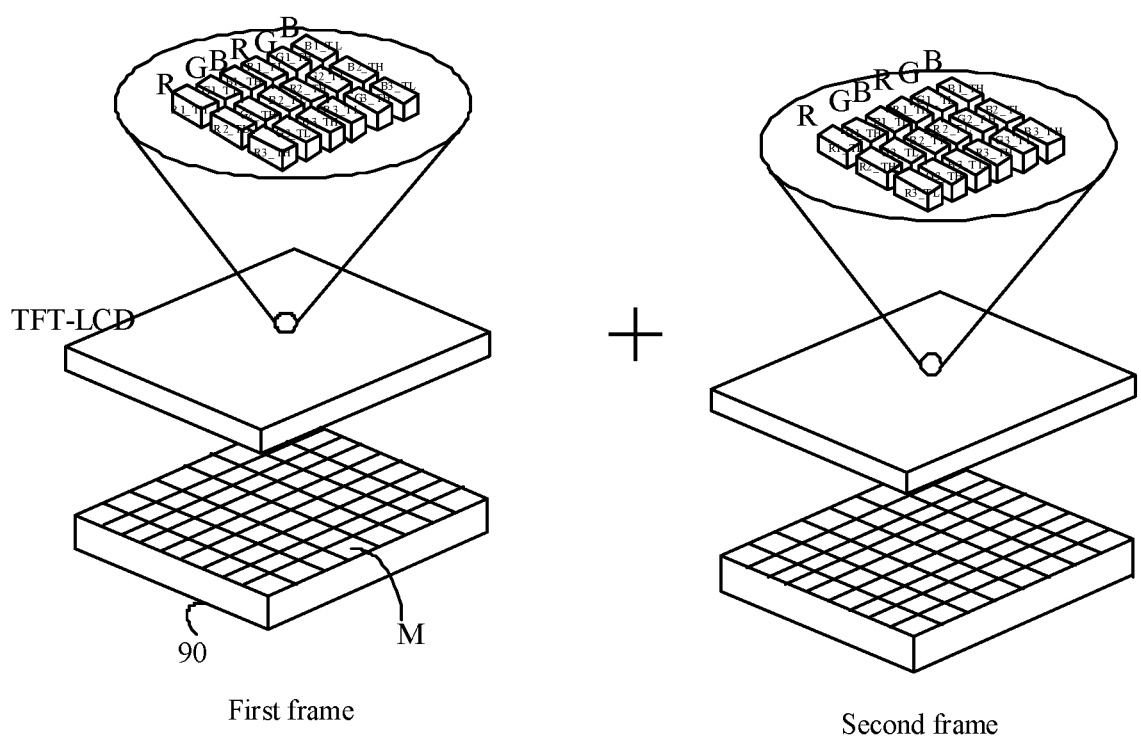
FIG. 3 is a schematic diagram of driving a display area of the liquid crystal display device in FIG. 1.
Figure 4:
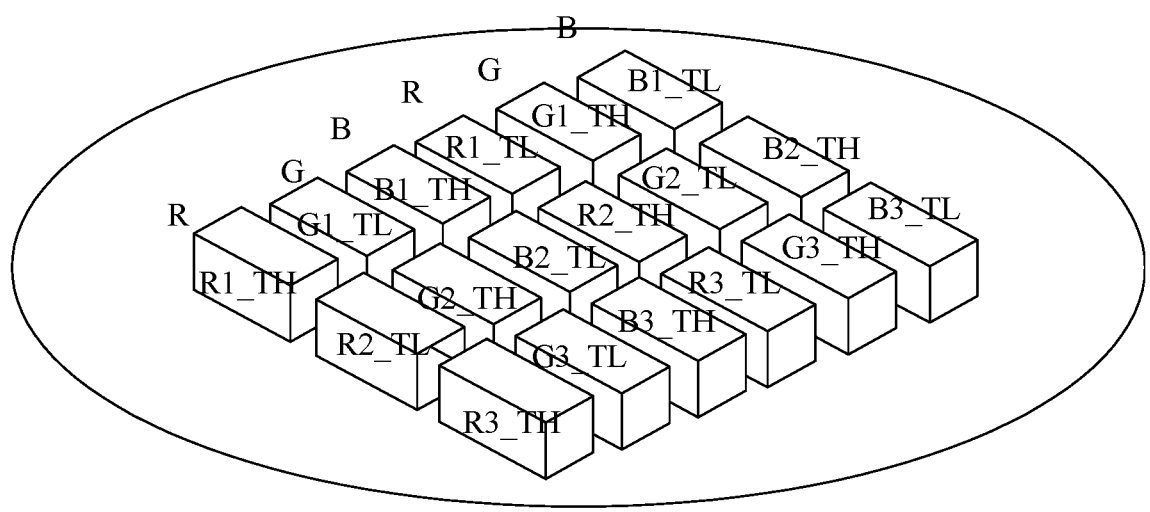

Each picture frame_N (that is, a conventional frame of picture) is displayed sequentially by using two frames of images, that is, a picture is segmented into two frames of images in a time sequence. By segmenting the picture in a time sequence, frequency doubling of a frame frequency may be implemented, that is, an original frequency 60 Hz is doubled to 120 Hz. The two frames of images are respectively a first frame of image (frame_N-1) and a second frame of image (frame_N-2). By means of mutual compensation of the first frame of image and the second frame of image, a picture corresponding to an input signal is displayed to a user. In this embodiment, two adjacent sub-pixels on each frame of image have a high drive voltage and a low drive voltage, and each sub-pixel has a high drive voltage and a low drive voltage in the first frame of image and the second frame of image. That is, a drive voltage of each sub-pixel of the first frame of image is reversed to form a drive voltage of each sub-pixel of the second frame of image. The drive voltage of each sub-pixel in the first frame of image and the second frame of image may be obtained by searching a look up table (LUT). Specifically, the liquid crystal display device pre-stores the look up table in a hardware frame buffer. The look up table is a correspondence table of a picture input signal and a drive voltage of each sub-pixel of a first frame of image and a second frame of image corresponding to the input signal. From the perspective of an 8-bit drive signal, each R/G/B input signal inputs color gray values 0 to 255 corresponding to 256 pairs of high and low voltage signals, and there are a total of 3*256 pairs of high voltage signals $R_{TH}/G_{TH}/B_{TH}$ and low voltage signals $R_{TL}/G_{TL}/B_{TL}$. Therefore, a corresponding high drive voltage and a corresponding low drive voltage may be searched according to a color gray value of each sub-pixel in an input signal, so that a corresponding sub-pixel in the first frame of image is driven by using the high drive voltage and a corresponding sub-pixel in the second frame of image is driven by using the low drive voltage, or a corresponding sub-pixel in the first frame of image is driven by using the low drive voltage and a corresponding sub-pixel in the second frame of image is driven by using the high drive voltage, and two adjacent sub-pixels are driven by using a drive manner of high and low drive voltages at intervals, as shown in FIG. 3. FIG. 4 is a partial enlarged view of the first frame in FIG. 3, and FIG. 5 is a partial enlarged view of the second frame in FIG. 3.

S120, determine a backlight lightness adjustment signal of each backlight subarea according to drive voltages of a first frame of image area and a second frame of image area corresponding to each backlight subarea and a first frame of image area and a second frame of image area corresponding to backlight subareas adjacent to a first direction, a second direction, a third direction, and a fourth direction of the backlight subarea.

The backlight lightness adjustment signal is used to perform backlight lightness adjustment on two frames of images of a next picture, to reduce a viewing angle color shift of the picture. The backlight lightness adjustment signal is signals in groups ($A_{M\_P1}$ and $A_{M\_P2}$, and P represents a target color sub-pixel), to respectively adjust the backlight lightness of the backlight subarea corresponding to the first frame of image and the second frame of image. Moreover, a quantity of groups of the backlight lightness adjustment signal is the same as a quantity of types of color sub-pixels, to independently control backlight lightness of the various types of the color sub-pixels. For example, in this embodiment, the color sub-pixel includes a red sub-pixel (R sub-pixel), a green sub-pixel (G sub-pixel), and a blue sub-pixel (B sub-pixel). Therefore, each group of the backlight lightness adjustment signals includes a group of R sub-pixel backlight lightness adjustment signals, a group of G sub-pixel backlight lightness adjustment signals, and a group of B sub-pixel backlight lightness adjustment signals, to independently adjust and control the backlight lightness of various types of the color sub-pixels of each backlight subarea.

In this embodiment, a process of determining the backlight lightness adjustment signal is shown in FIG. 6, and includes S210 and S220.

S210, collect statistics of an average drive voltage of various types of the color sub-pixels in the first frame of image area and the second frame of image area corresponding to each backlight subarea.

Calculation formulas for the average drive voltage of each type of the color sub-pixel in a corresponding first frame of image area in each backlight subarea are as follows:

$$P_{M\_ave1} = \text{Ave}(P_{M\_n\_TL}, P_{M\_n+1\_TH}, P_{M\_n+2\_TL}, \ldots),$$

where n=1, 2, 3 . . . .

P represents the target color sub-pixel, M represents a sequence number of the backlight subarea and the backlight subareas adjacent to the first direction, the second direction, the third direction, and the fourth direction of the backlight subarea, ave1 represents the average drive voltage value of the first frame of image, and n represents a sequence number of a P sub-pixel in a backlight subarea M.

Specifically, calculation formulas for the average drive voltage of the various types of the color sub-pixels are as follows:

$$R_{M\_ave1} = \text{Ave}(R_{M\_n\_TL}, R_{M\_n+1\_TH}, R_{M\_n+2\_TL}, \ldots),$$

where n=1, 2, 3 . . . ;

$$G_{M\_ave1} = \text{Ave}(G_{M\_n\_TH}, G_{M\_n+1\_TL}, G_{M\_n+2\_TH}, \ldots),$$

where n=1, 2, 3 . . . ; and $$B_{M\_ave1} = \text{Ave}(B_{M\_n\_TL}, B_{M\_n+1\_TH}, B_{M\_n+2\_TL}, \ldots),$$

where n=1, 2, 3 . . . .

S220, acquire the backlight lightness adjustment signal according to the average drive voltage, a reference backlight lightness signal, and a reference drive voltage of each backlight subarea.

The reference backlight lightness signal refers to a backlight lightness signal required when no high and low voltage compensation (that is, a conventional drive manner) is performed. The reference drive voltage refers to a drive voltage of various types of sub-pixels when no high and low voltage compensation is performed. Because the backlight source corresponding to various types of the color sub-pixels in each subarea is independently controlled, the backlight lightness adjustment signal of the backlight source corresponding to the various types of the color sub-pixels in each subarea needs to be acquired. Calculation formulas for the backlight lightness adjustment signal of each types of the color sub-pixel in each backlight subarea and in backlight subareas M adjacent to the first direction, the second direction, the third direction, and the fourth direction of the backlight subarea are as follows:

$$A_{M\_P1} * P_{M\_ave1} = A_{M\_P2} * P_{M\_ave2};$$

and $$2 * A_{M\_P} * P_{M\_ave} = A_{M\_P1} * P_{M\_ave1} + A_{M\_P2} * P_{M\_ave2}.$$

P represents the target color sub-pixel. M represents the sequence number of the backlight subarea and the backlight subareas adjacent to the first direction, the second direction, the third direction, and the fourth direction of the backlight subarea. $A_{M\_P1}$ represents the backlight lightness adjustment signal used to perform backlight lightness adjustment on the backlight source of a P sub-pixel in the backlight subarea corresponding to the first frame of image of a next picture and in the backlight subareas M adjacent to the first direction, the second direction, the third direction, and the fourth direction of the backlight subarea. AM_P2 represents the backlight lightness adjustment signal used to perform the backlight lightness adjustment on the backlight source of the P sub-pixel in the backlight subarea corresponding to the second frame of image of the next picture and in the backlight subareas M adjacent to the first direction, the second direction, the third direction, and the fourth direction of the backlight subarea. PM_ave1 represents an average value of drive voltages of the P sub-pixel in the backlight subarea corresponding to the first frame of image of a current picture and in the backlight subareas M adjacent to the first direction, the second direction, the third direction, and the fourth direction of the backlight subarea. In this embodiment, because the drive voltage of the sub-pixel matches the input signal (that is, the gray value of a corresponding color), the average value of the drive voltages can be used as an evaluation parameter of viewing angle lightness of the color sub-pixel. PM_ave2 represents an average value of drive voltages of the P sub-pixel in the backlight subarea corresponding to the second frame of image of the current picture and in the backlight subareas M adjacent to the first direction, the second direction, the third direction, and the fourth direction of the backlight subarea. AM_P represents the reference backlight lightness signal of the P sub-pixel in the backlight subarea corresponding to the image of the current picture and in the backlight subareas M adjacent to the first direction, the second direction, the third direction, and the fourth direction of the backlight subarea. PM_ave represents an average value of reference drive voltages of the P sub-pixel in a frame pattern area corresponding to the backlight subarea and the backlight subareas M adjacent to the first direction, the second direction, the third direction, and the fourth direction of the backlight subarea on the image of the current picture. Specifically, PM_ave1=Ave(Pn+Pn+1+Pn+2+ . . . ), where n=1, 2, 3 . . . .

In this embodiment, a pixel of each frame of image includes an R sub-pixel, a G sub-pixel, and a B sub-pixel. Therefore, correspondingly, the backlight lightness adjustment signals of the backlight sources of various types of the color sub-pixels in each backlight subarea need to be acquired, specifically as follows:

Acquisition formulas of the backlight lightness adjustment signals $A_{M\_R1}$ and $A_{M\_R2}$ of the R sub-pixel in the backlight subarea and in the backlight subareas M adjacent to the first direction, the second direction, the third direction, and the fourth direction of the backlight subarea are as follows:

$$A_{M\_R1}*R_{M\_ave1}=A_{M\_R2}*R_{M\_ave2};$$

and $$2*A_{M\_R}*R_{M\_ave}=A_{M\_R1}*R_{M\_ave1}+A_{M\_R2}*R_{M\_ave2}.$$

Acquisition formulas of the backlight lightness adjustment signals AM_G1 and AM_G2 of the G sub-pixel in the backlight subarea and in the backlight subareas M adjacent to the first direction, the second direction, the third direction, and the fourth direction of the backlight subarea are as follows:

$$A_{M\_G1}*G_{M\_ave1}=A_{M\_G2}*G_{M\_ave2};$$

and $$2*A_{M\_G}*G_{M\_ave}=A_{M\_G1}*G_{M\_ave1}+A_{M\_G2}*G_{M\_ave2}.$$

Acquisition formulas of the backlight lightness adjustment signals $A_{M\_B1}$ and $A_{M\_B2}$ of the B sub-pixel in the backlight subarea and in the backlight subareas M adjacent to the first direction, the second direction, the third direction, and the fourth direction of the backlight subarea are as follows:

$$A_{M\_B1}*B_{M\_ave1}=A_{M\_B2}*B_{M\_ave2};$$

and $$2*A_{M\_B}*B_{M\_ave}=A_{M\_B1}*B_{M\_ave1}+A_{M\_B2}*B_{M\_ave2}.$$

S130, perform independent lightness adjustment on a backlight source of various types of the color sub-pixels in a corresponding backlight subarea of each frame of image of a next picture according to the backlight lightness adjustment signal of each backlight subarea.

In an embodiment, the backlight lightness adjustment signal of each backlight subarea is also determined according to an adjustment parameter, and the adjustment parameter is determined according to the drive voltages of the first frame of image area and the second frame of image area corresponding to each backlight subarea and the first frame of image area and the second frame of image area of the backlight subarea adjacent to the first direction of the backlight subarea.

In an embodiment, the backlight lightness adjustment signal of each backlight subarea is also determined according to an adjustment parameter, and the adjustment parameter is determined according to the drive voltages of the first frame of image area and the second frame of image area corresponding to each backlight subarea and the first frame of image area and the second frame of image area of the backlight subarea adjacent to the second direction of the backlight subarea.

In an embodiment, the backlight lightness adjustment signal of each backlight subarea is also determined according to an adjustment parameter, and the adjustment parameter is determined according to the drive voltages of the first frame of image area and the second frame of image area corresponding to each backlight subarea and the first frame of image area and the second frame of image area of the backlight subarea adjacent to the third direction of the backlight subarea.

In an embodiment, the backlight lightness adjustment signal of each backlight subarea is also determined according to an adjustment parameter, and the adjustment parameter is determined according to the drive voltages of the first frame of image area and the second frame of image area corresponding to each backlight subarea and the first frame of image area and the second frame of image area of the backlight subarea adjacent to the fourth direction of the backlight subarea.

In an embodiment, the backlight lightness adjustment signal of each backlight subarea is also determined according to an adjustment parameter, and the adjustment parameter is determined according to the drive voltages of the first frame of image area corresponding to each backlight subarea and the first frame of image area of the backlight subarea adjacent to the fourth direction of the backlight subarea.

In the adjustment process, according to $A_{M\_R1}$, $A_{M\_G1}$, and $A_{M\_B1}$, the backlight sources of the R sub-pixel, the G sub-pixel, and the B sub-pixel in the corresponding backlight subarea of the first frame of image of the next picture and in the backlight subareas M adjacent to the first direction, the second direction, the third direction, and the fourth direction of the backlight subarea are adjusted independently, and according to $A_{M\_R2}$, $A_{M\_G2}$ and $A_{M\_B2}$, the backlight source of the R sub-pixel, the G sub-pixel, and the B sub-pixel in the corresponding backlight subarea of the second frame of image of the next picture and in the backlight subareas M adjacent to the first direction, the second direction, the third direction, and the fourth direction of the backlight subarea are adjusted independently, so that compensated picture lightness is the same as picture lightness when no high and low voltage compensation (that is, a conventional drive manner) is performed. Through the independent backlight source control, a visible flicker and discomfort phenomenon caused by a switching difference of high and low voltages during driving can be reduced, and a disadvantage of a color shift caused by mismatching of a refractive index of the liquid crystal display device in a large viewing angle is effectively improved.

In the foregoing drive method of a liquid crystal display device, each picture is displayed sequentially by using two frames of images, where each frame of image is driven by using high and low voltage signals at intervals, and the high and low drive voltages of the first frame of image and the second frame of image are reversed, and a backlight lightness adjustment signal of a next picture is generated according to each drive voltage, to perform independent backlight adjustment on a backlight source of various types of the color sub-pixels in a corresponding backlight subarea in each frame of image of the next picture. In the foregoing drive method, accompanied by the compensation of the lightness of each backlight subarea and backlight subareas M adjacent to a first direction, a second direction, a third direction, and a fourth direction of the backlight subarea, not only entire panel lightness and conventional drive lightness without compensation can be maintained unchanged, but also an viewing angle compensation effect of a Low Color Shift can be implemented, and further, a visible flicker and discomfort phenomenon caused by a switching difference of high and low voltages during previous driving can be avoided, and a disadvantage of a color shift caused by mismatching of a refractive index of the liquid crystal display device in a large viewing angle is effectively improved. In the foregoing drive method, cooperating driving in time domain and space domain can be implemented. Moreover, by using the foregoing drive method, pixels of the liquid crystal display device do not need to be further divided into primary and secondary sub-pixels, so that technique complexity of the display panel can be greatly reduced, and a penetration rate and resolution of the liquid crystal display panel are greatly increased, thereby reducing costs of the backlight design.

Figure 7:
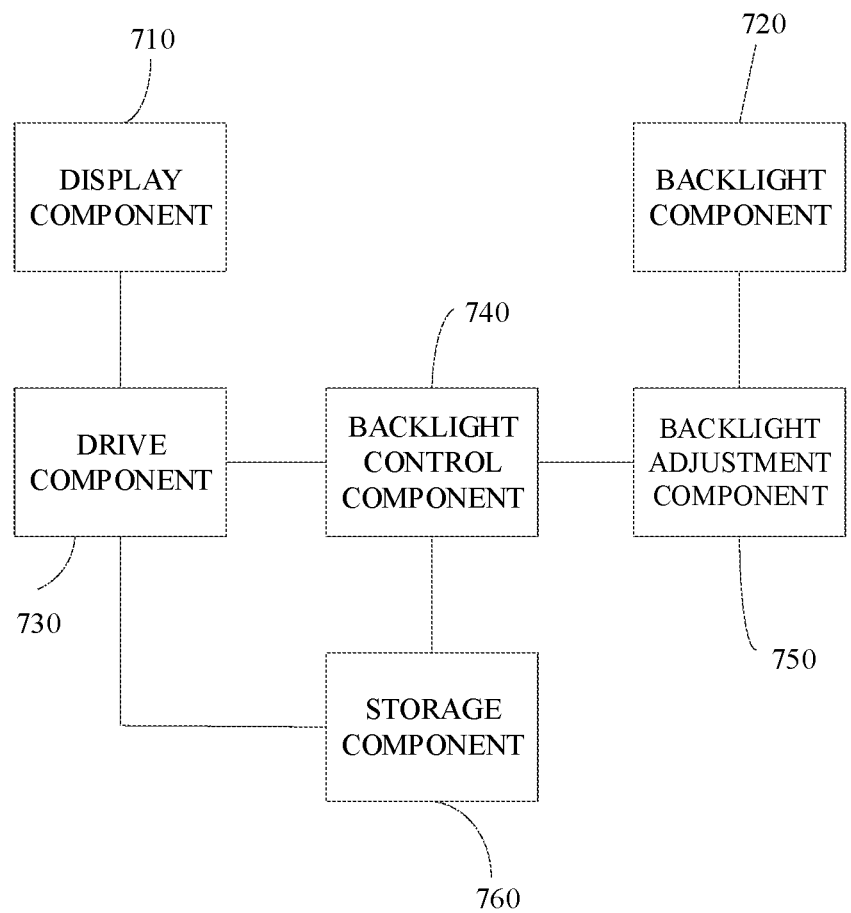
FIG. 7 is a structural block diagram of a liquid crystal display device in an embodiment.

The present disclosure further provides a liquid crystal display device, as shown in FIG. 7. The liquid crystal display device may perform the foregoing drive method. The liquid crystal display device includes a display component 710 and a backlight component 720, and further includes a drive component 730, a backlight control component 740, and a backlight adjustment component 750. The display component 710 and the drive component 730 may be integrated on a display panel, and the backlight component 720, the backlight control component 740, and the backlight adjustment component 750 may be integrated on a backlight module. It may be understood that, the integration manner of the components is not limited thereto.

The display component 710 may use a TN, OCB, or VA-type TFT display panel, but is not limited thereto. The display component 710 may be a display component having a curved panel.

The backlight component 720 is configured to provide backlight. The backlight component 720 may use direct-light type backlight, and the backlight source may be a white light source, an RGB light source, an RGBW light source, or an RGBY light source, but is not limited thereto. A backlight area of the backlight component 720 is divided into multiple backlight subareas, as shown in FIG. 2.

The drive component 730 is connected to the display component 710. The drive component 730 is configured to display each picture by using two frames of images. The two frames of images are respectively a first frame of image and a second frame of image. By means of mutual compensation of the first frame of image and the second frame of image, a picture corresponding to an input signal is displayed to a user. In this embodiment, two adjacent sub-pixels on each frame of image have a high drive voltage and a low drive voltage, and each sub-pixel has a high drive voltage and a low drive voltage in the first frame of image and the second frame of image. That is, the drive voltage of each sub-pixel of the first frame of image is reversed to form the drive voltage of each sub-pixel of the second frame of image. The drive voltage of the drive component 730 for driving each sub-pixel may be obtained by searching a look up table. Specifically, the liquid crystal display device pre-stores the look up table in a hardware frame buffer. The look up table is a correspondence table of an input signal and a drive voltage of each sub-pixel of a first frame of image and a second frame of image corresponding to the input signal. The drive component 730 includes a timing control circuit (TCON, short for timing controller). In an embodiment, the liquid crystal display device further includes a storage component 760, configured to store the look up table.

The backlight control component 740 is connected to the drive component 730. The backlight control component 740 is configured to determine a backlight lightness adjustment signal of each backlight subarea according to drive voltages of a first frame of image area and a second frame of image area corresponding to each backlight subarea and a first frame of image area and a second frame of image area corresponding to backlight subareas adjacent to a first direction, a second direction, a third direction, and a fourth direction of the backlight subarea. The backlight lightness adjustment signal is signals in groups ($A_{M\_P1}$ and $A_{M\_P2}$, and P represents a target color sub-pixel), to respectively adjust the backlight lightness of the backlight subarea corresponding to the first frame of image and the second frame of image. Moreover, a quantity of groups of the backlight lightness adjustment signal is the same as a quantity of types of the color sub-pixels, to independently control the backlight lightness of the various types of the color sub-pixels. For example, in this embodiment, the color sub-pixel includes a red sub-pixel (R sub-pixel), a green sub-pixel (G sub-pixel), and a blue sub-pixel (B sub-pixel). Therefore, each group of backlight lightness adjustment signals includes a group of R sub-pixel backlight lightness adjustment signals, a group of G sub-pixel backlight lightness adjustment signals, and a group of B sub-pixel backlight lightness adjustment signals, to independently adjust and control the backlight lightness of various types of the color sub-pixels of each backlight subarea.

Figure 8:
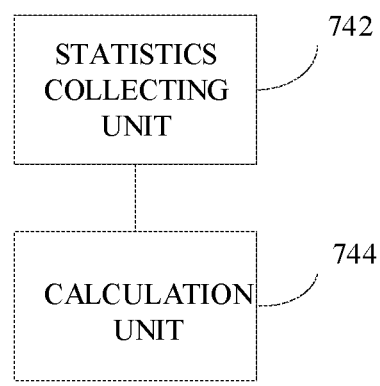
FIG. 8 is a structural block diagram of a backlight control component in an embodiment.

The backlight control component 740 includes a statistics collecting unit 742 and a calculation unit 744, as shown in FIG. 8. Formulas used by the statistics collecting unit 742 for calculating the average drive voltage of each color sub-pixel in a corresponding first frame of image area in each backlight subarea are as follows:

$$P_{M\_ave1}=\text{Ave}(P_{M\_n\_TL}, P_{M\_n+1\_TH}, P_{M\_n+2\_TL}, \dots),$$

where n=1, 2, 3 . . . .

P represents the target color sub-pixel, M represents a sequence number of the backlight subarea and the backlight subareas adjacent to a first direction, a second direction, a third direction, and a fourth direction of the backlight subarea, ave1 represents an average drive voltage value of the first frame of image, and n represents a sequence number of a P sub-pixel in a backlight subarea M.

Specifically, calculation formulas for the average drive voltage of the various types of the color sub-pixels are as follows:

$$R_{M\_ave1} = \text{Ave}(R_{M\_n\_TL}, R_{M\_n+1\_TH}, R_{M\_n+2\_TL}, \ldots),$$

where n=1, 2, 3 . . . ;

$$G_{M\_ave1} = \text{Ave}(G_{M\_n\_TH}, G_{M\_n+1\_TL}, G_{M\_n+2\_TH}, \ldots),$$

where n=1, 2, 3 . . . ; and $$B_{M\_ave1} = \text{Ave}(B_{M\_n\_TL}, B_{M\_n+1\_TH}, B_{M\_n+2\_TL}, \ldots),$$

where n=1, 2, 3 . . . .

The calculation unit 744 is configured to acquire a backlight lightness adjustment signal according to the average drive voltage, a reference backlight lightness signal, and a reference drive voltage of each backlight subarea. The reference backlight lightness signal refers to a backlight lightness signal required when no high-low voltage compensation (that is, a conventional drive manner) is performed. The reference drive voltage refers to a drive voltage of various types of the sub-pixels when no high-low voltage compensation is performed. Because a backlight source corresponding to various types of the color sub-pixels in each subarea is independently controlled, the backlight lightness adjustment signal of the backlight source corresponding to the various types of the color sub-pixels in each subarea needs to be acquired. Calculation formulas for the backlight lightness adjustment signal of each types of the color sub-pixels in each backlight subarea M are as follows:

$$A_{M\_P1} * P_{M\_ave1} = A_{M\_P2} * P_{M\_ave2};$$

and $$2 * A_{M\_P} * P_{M\_ave} = A_{M\_P1} * P_{M\_ave1} + A_{M\_P2} * P_{M\_ave2}.$$

P represents a target color sub-pixel. M represents a sequence number of the backlight subarea and the backlight subareas adjacent to the first direction, the second direction, the third direction, and the fourth direction of the backlight subarea. $A_{M\_P1}$ represents the backlight lightness adjustment signal used to perform backlight lightness adjustment on the backlight source of a P sub-pixel in the backlight subarea corresponding to the first frame of image of a next picture and in the backlight subareas M adjacent to the first direction, the second direction, the third direction, and the fourth direction of the backlight subarea. $A_{M\_P2}$ represents the backlight lightness adjustment signal used to perform the backlight lightness adjustment on the backlight source of the P sub-pixel in the backlight subarea corresponding to the second frame of image of the next picture and in the backlight subareas M adjacent to the first direction, the second direction, the third direction, and the fourth direction of the backlight subarea. $P_{M\_ave1}$ represents an average value of drive voltages of the P sub-pixel in the backlight subarea corresponding to the first frame of image of a current picture and in the backlight subareas M adjacent to the first direction, the second direction, the third direction, and the fourth direction of the backlight subarea. In this embodiment, because the drive voltage of the sub-pixel matches the input signal (that is, a gray value of a corresponding color), an average value of the drive voltage can be used as an evaluation parameter of viewing angle lightness of the color sub-pixel. $P_{M\_ave2}$ represents an average value of drive voltages of the P sub-pixel in the backlight subarea corresponding to the second frame of image of the current picture and in the backlight subareas M adjacent to the first direction, the second direction, the third direction, and the fourth direction of the backlight subarea. $A_{M\_P}$ represents the reference backlight lightness signal of the P sub-pixel in the backlight subarea corresponding to the image of the current picture and in the backlight subareas M adjacent to the first direction, the second direction, the third direction, and the fourth direction of the backlight subarea. $P_{M\_ave}$ represents an average value of reference drive voltages of the P sub-pixel in a frame pattern area corresponding to the backlight subarea and the backlight subareas M adjacent to the first direction, the second direction, the third direction, and the fourth direction of the backlight subarea on the image of the current picture. Specifically, $P_{M\_ave1} = \text{Ave}(P_n + P_{n+1} + P_{n+2} + \ldots)$, where n=1, 2, 3 . . . .

It should be further noted that, in an embodiment, M may represent a backlight subarea sequence number acquired according to the adjustment parameter, and the adjustment parameter is adjusted to overcome a color difference between compensated picture lightness and picture lightness when no high and low voltage compensation is performed.

The backlight adjustment component 750 is connected to the backlight control component 740 and the backlight component 720 respectively. The backlight adjustment component 750 is configured to perform independent lightness adjustment on the backlight sources of various types of the color sub-pixels in the corresponding backlight subarea in each frame of image of a next picture according to the backlight lightness adjustment signal of each backlight subarea, so that compensated picture lightness is the same as the picture lightness when no high and low voltage compensation is performed.

In the foregoing liquid crystal display device, each picture is displayed sequentially by using two frames of images, where each frame of image is driven by using high and low voltage signals at intervals, and high and low drive voltages of the first frame of image and the second frame of image are reversed, and a backlight lightness adjustment signal of a next picture is generated according to each drive voltage, to perform independent backlight adjustment on the backlight sources of various types of the color sub-pixels in a corresponding backlight subarea in each frame of image of the next picture. In the foregoing liquid crystal display device, accompanied by the compensation of lightness of each backlight subarea and the backlight subarea M adjacent to the first direction, the second direction, the third direction, and the fourth direction of the backlight subarea, not only entire panel lightness and conventional drive lightness without compensation can be maintained unchanged, but also an viewing angle compensation effect of a Low Color Shift can be implemented, and further, a visible flicker and discomfort phenomenon caused by a switching difference of high and low voltages during previous driving can be avoided, and a disadvantage of a color shift caused by mismatching of a refractive index of the liquid crystal display device in a large viewing angle is effectively overcome. The foregoing liquid crystal display device can implement cooperating driving in time domain and space domain. Moreover, pixels of the liquid crystal display device do not need to be further divided into primary and secondary sub-pixels, so that technique complexity of the display panel can be greatly reduced, and a penetration rate and resolution of the liquid crystal display panel are greatly increased, thereby reducing costs of the backlight design.

Various technical features in the foregoing embodiments may be combined arbitrarily. For ease of description, possible combinations of various technical features in the foregoing embodiments are not all described. However, the combinations of the technical features should be considered as falling within the scope recorded in this specification as long as the combinations of the technical features have no collision with each other.

The foregoing embodiments are merely several implementations of the present disclosure, which are described in a relatively specific and detailed manner. However, this should not be constructed as a limitation to the scope of the present disclosure. It should be noted that, a person of ordinary skill in the art may make various changes and improvements without departing from the ideas of the present disclosure, which shall fall within the protection scope of the present disclosure. Therefore, the protection scope of the patent of the present disclosure shall be subject to the claims.

The invention claimed is:

1. A drive method of a liquid crystal display device, comprising:
    displaying each picture sequentially by using two frames of images, wherein the two frames of images comprise a first frame of image and a second frame of image; two adjacent sub-pixels on each frame of image have a high drive voltage and a low drive voltage, and each sub-pixel has a high drive voltage and a low drive voltage in the first frame of image and the second frame of image;
    determining a backlight lightness adjustment signal of each backlight subarea according to drive voltages of a first frame of image area and a second frame of image area corresponding to each backlight subarea and a first frame of image area and a second frame of image area corresponding to backlight subareas adjacent to a first direction, a second direction, a third direction, and a fourth direction of the backlight subarea, wherein the backlight lightness adjustment signal is signals in groups and a quantity of groups is the same as a quantity of types of color sub-pixels; and
    performing independent lightness adjustment on a backlight source of various types of the color sub-pixels in a corresponding backlight subarea of each frame of image of a next picture according to the backlight lightness adjustment signal of each backlight subarea and the backlight subareas adjacent to the first direction, the second direction, the third direction, and the fourth direction of the backlight subarea.

2. The method according to claim 1, wherein the drive voltage of each sub-pixel of the first frame of image and the second frame of image is obtained by searching a look up table according to an input signal of each picture.

3. The method according to claim 1, wherein the step of determining a backlight lightness adjustment signal of each backlight subarea according to drive voltages of a first frame of image area and a second frame of image area corresponding to each backlight subarea and a first frame of image area and a second frame of image area corresponding to backlight subareas adjacent to a first direction, a second direction, a third direction, and a fourth direction of the backlight subarea comprises:
    collecting statistics of an average drive voltage of various types of the color sub-pixels in the first frame of image area and the second frame of image area corresponding to each backlight subarea and the backlight subareas adjacent to the first direction, the second direction, the third direction, and the fourth direction of the backlight subarea; and
    acquiring the backlight lightness adjustment signal according to the average drive voltage, a reference backlight lightness signal, and a reference drive voltage of each backlight subarea and the backlight subareas adjacent to the first direction, the second direction, the third direction, and the fourth direction of the backlight subarea.

4. The method according to claim 3, wherein in the step of acquiring the backlight lightness adjustment signal according to the average drive voltage, a reference backlight lightness signal, and a reference drive voltage of each backlight subarea and the backlight subareas adjacent to the first direction, the second direction, the third direction, and the fourth direction of the backlight subarea, calculation formulas for the backlight lightness adjustment signal of each type of the color sub-pixel in each backlight subarea are as follows:

$$A_{M\_P1}*P_{M\_ave1}=A_{M\_P2}*P_{M\_ave2}; \text{ and}$$

$$2*A_{M\_P}*P_{M\_ave}=A_{M\_P1}*P_{M\_ave1}+A_{M\_P2}*P_{M\_ave2},$$

wherein P represents a target color sub-pixel; M represents a sequence number of the backlight subarea and the backlight subareas adjacent to the first direction, the second direction, the third direction, and the fourth direction of the backlight subarea; $A_{M\_P1}$ represents the backlight lightness adjustment signal used to perform backlight lightness adjustment on the backlight source of a P sub-pixel in the backlight subarea corresponding to the first frame of image of a next picture and in the backlight subareas M adjacent to the first direction, the second direction, the third direction, and the fourth direction of the backlight subarea; $A_{M\_P2}$ represents the backlight lightness adjustment signal used to perform the backlight lightness adjustment on the backlight source of the P sub-pixel in the backlight subarea corresponding to the second frame of image of the next picture and in the backlight subareas M adjacent to the first direction, the second direction, the third direction, and the fourth direction of the backlight subarea; $P_{M\_ave1}$ represents an average value of drive voltages of the P sub-pixel in the backlight subarea corresponding to the first frame of image of a current picture and in the backlight subareas M adjacent to the first direction, the second direction, the third direction, and the fourth direction of the backlight subarea; $P_{M\_ave2}$ represents an average value of drive voltages of the P sub-pixel in the backlight subarea corresponding to the second frame of image of the current picture and in the backlight subareas M adjacent to the first direction, the second direction, the third direction, and the fourth direction of the backlight subarea; $A_{M\_P}$ represents the reference backlight lightness signal of the P sub-pixel in the backlight subarea corresponding to the image of the current picture and in the backlight subareas M adjacent to the first direction, the second direction, the third direction, and the fourth direction of the backlight subarea; and $P_{M\_ave}$ represents an average value of reference drive voltages of the P sub-pixel in a frame pattern area corresponding to the backlight subarea and the backlight subareas M adjacent to the first direction, the second direction, the third direction, and the fourth direction of the backlight subarea on the image of the current picture.

5. The method according to claim 1, wherein types of the color sub-pixel type on each frame of image comprises at least a red sub-pixel, a green sub-pixel, and a blue sub-pixel; and the backlight lightness adjustment signal comprises a red sub-pixel backlight adjustment signal, a green sub-pixel backlight adjustment signal, and a blue sub-pixel backlight adjustment signal, to perform independent backlight adjustment on various types of the color sub-pixels.

6. A liquid crystal display device, comprising:
a display component and a backlight component, wherein the backlight component is divided into multiple backlight subareas, and the liquid crystal display device further comprises:
a drive component, connected to the display component, and configured to display each picture sequentially by using two frames of images, wherein the two frames of images comprise a first frame of image and a second frame of image;
two adjacent sub-pixels on each frame of image have a high drive voltage and a low drive voltage, and each sub-pixel has a high drive voltage and a low drive voltage in the first frame of image and the second frame of image;
a backlight control component, connected to the drive component, wherein the backlight control component is configured to determine a backlight lightness adjustment signal of each backlight subarea according to drive voltages of a first frame of image area and a second frame of image area corresponding to each backlight subarea and a first frame of image area and a second frame of image area corresponding to backlight subareas adjacent to a first direction, a second direction, a third direction, and a fourth direction of the backlight subarea, wherein the backlight lightness adjustment signal is signals in groups and a quantity of groups is the same as a quantity of types of color sub-pixels; and
a backlight adjustment component, connected to the backlight control component and the backlight component respectively, wherein the backlight adjustment component is configured to perform independent lightness adjustment on a backlight source of various types of the color sub-pixels in a corresponding backlight subarea of each frame of image of a next picture according to the backlight lightness adjustment signal of each backlight subarea.

7. The liquid crystal display device according to claim 6, further comprising a storage component, wherein the storage component is configured to store a look up table; the look up table is a correspondence table of an input signal and a drive voltage of each sub-pixel in the first frame of image and the second frame of image corresponding to the input signal; and the drive component obtains the drive voltage of each sub-pixel in the first frame of image and the second frame of image by using the look up table.

8. The liquid crystal display device according to claim 6, wherein the backlight control component comprises:
a statistics collecting unit, configured to collect statistics of an average drive voltage of various types of the color sub-pixels in the first frame of image area and the second frame of image area corresponding to each backlight subarea; and
a calculation unit, configured to acquire the backlight lightness adjustment signal according to the average drive voltage, a reference backlight lightness signal, and a reference drive voltage of each backlight subarea.

9. The liquid crystal display device according to claim 8, wherein calculation formulas used by the calculation unit to acquire the backlight lightness adjustment signal of each type of the color sub-pixel in each backlight subarea are as follows:

$$A_{M\_P1}*P_{M\_ave1}=A_{M\_P2}*P_{M\_ave2}; \text{ and}$$

$$2*A_{M\_P}*P_{M\_ave}=A_{M\_P1}*P_{M\_ave1}+A_{M\_P2}*P_{M\_ave2},$$

wherein P represents a target color sub-pixel; M represents a sequence number of the backlight subarea and the backlight subareas adjacent to the first direction, the second direction, the third direction, and the fourth direction of the backlight subarea; $A_{M\_P1}$ represents the backlight lightness adjustment signal used to perform backlight lightness adjustment on the backlight source of a P sub-pixel in the backlight subarea corresponding to the first frame of image of a next picture and in the backlight subareas M adjacent to the first direction, the second direction, the third direction, and the fourth direction of the backlight subarea; $A_{M\_P2}$ represents the backlight lightness adjustment signal used to perform the backlight lightness adjustment on the backlight source of the P sub-pixel in the backlight subarea corresponding to the second frame of image of the next picture and in the backlight subareas M adjacent to the first direction, the second direction, the third direction, and the fourth direction of the backlight subarea; $P_{M\_ave1}$ represents an average value of drive voltages of the P sub-pixel in the backlight subarea corresponding to the first frame of image of a current picture and in the backlight subareas M adjacent to the first direction, the second direction, the third direction, and the fourth direction of the backlight subarea; $P_{M\_ave2}$ represents an average value of drive voltages of the P sub-pixel in the backlight subarea corresponding to the second frame of image of the current picture and in the backlight subareas M adjacent to the first direction, the second direction, the third direction, and the fourth direction of the backlight subarea; $A_{M\_P}$ represents the reference backlight lightness signal of the P sub-pixel in the backlight subarea corresponding to the image of the current picture and in the backlight subareas M adjacent to the first direction, the second direction, the third direction, and the fourth direction of the backlight subarea; and $P_{M\_ave}$ represents an average value of reference drive voltages of the P sub-pixel in a frame pattern area corresponding to the backlight subarea and the backlight subareas M adjacent to the first direction, the second direction, the third direction, and the fourth direction of the backlight subarea on the image of the current picture.

10. The liquid crystal display device according to claim 6, wherein the backlight source is a white light backlight source, an RGB backlight source, an RGBW backlight source, or an RGBY backlight source.

11. A drive method of a liquid crystal display device, comprising:
displaying each picture sequentially by using two frames of images, wherein the two frames of images comprise a first frame of image and a second frame of image; two adjacent sub-pixels on each frame of image have a high drive voltage and a low drive voltage, and each sub-pixel has a high drive voltage and a low drive voltage in the first frame of image and the second frame of image;

determining a backlight lightness adjustment signal of each backlight subarea according to an adjustment parameter, wherein the backlight lightness adjustment signal is signals in groups and a quantity of groups is the same as a quantity of types of color sub-pixels; and performing independent lightness adjustment on a backlight source of various types of the color sub-pixels in a corresponding backlight subarea of each frame of image of a next picture according to the backlight lightness adjustment signal.

12. The method according to claim 11, wherein the drive voltage of each sub-pixel of the first frame of image and the second frame of image is obtained by searching a look up table according to an input signal of each picture.

13. The method according to claim 11, wherein the step of determining a backlight lightness adjustment signal of each backlight subarea according to an adjustment parameter comprises:

collecting statistics of an average drive voltage that is calculated according to the adjustment parameter and that is of various types of the color sub-pixels in the first frame of image area and the second frame of image area corresponding to each backlight subarea; and acquiring the backlight lightness adjustment signal according to the average drive voltage calculated according to the adjustment parameter, a reference backlight lightness signal, and a reference drive voltage of each backlight subarea.

14. The method according to claim 13, wherein in the step of acquiring the backlight lightness adjustment signal according to the average drive voltage calculated according to the adjustment parameter, a reference backlight lightness signal, and a reference drive voltage of each backlight subarea, calculation formulas for the backlight lightness adjustment signal of each type of the color sub-pixel in each backlight subarea are as follows:

$$A_{M\_P1} * P_{M\_ave1} = A_{M\_P2} * P_{M\_ave2}; \text{ and}$$

$$2 * A_{M\_P} * P_{M\_ave} = A_{M\_P1} * P_{M\_ave1} + A_{M\_P2} * P_{M\_ave2},$$

wherein P represents a target color sub-pixel; M represents a sequence number of the backlight subarea acquired according to the adjustment parameter; $A_{M\_P1}$ represents the backlight lightness adjustment signal used to perform backlight lightness adjustment on the backlight source of a P sub-pixel in the backlight subarea corresponding to a first frame of image of a next picture and in the sequence number of the backlight subarea M acquired according to the adjustment parameter; $A_{M\_P2}$ represents the backlight lightness adjustment signal used to perform the backlight lightness adjustment on the backlight source of the P sub-pixel in the backlight subarea corresponding to the second frame of image of the next picture and in the sequence number of the backlight subarea M acquired according to the adjustment parameter; $P_{M\_ave1}$ represents an average value of drive voltages of the P sub-pixel in the backlight subarea corresponding to the first frame of image of a current picture and in the sequence number of the backlight subarea M acquired according to the adjustment parameter; $P_{M\_ave2}$ represents an average value of drive voltages of the P sub-pixel in the backlight subarea corresponding to the second frame of image of the current picture and in the sequence number of the backlight subarea M acquired according to the adjustment parameter; $A_{M\_P}$ represents the reference backlight lightness signal of the P sub-pixel in the backlight subarea corresponding to the image of the current picture and in the sequence number of the backlight subarea M acquired according to the adjustment parameter; and $P_{M\_ave}$ represents an average value of reference drive voltages of the P sub-pixel in a frame pattern area corresponding to the backlight subarea and the sequence number of the backlight subarea M acquired according to the adjustment parameter of the backlight subarea on the image of the current picture.

15. The method according to claim 11, wherein types of the color sub-pixel type on each frame of image comprises at least a red sub-pixel, a green sub-pixel, and a blue sub-pixel; and the backlight lightness adjustment signal comprises a red sub-pixel backlight adjustment signal, a green sub-pixel backlight adjustment signal, and a blue sub-pixel backlight adjustment signal, to perform independent backlight adjustment on various types of the color sub-pixels.

16. The method according to claim 11, wherein the adjustment parameter is determined according to the drive voltages of a first frame of image area and a second frame of image area corresponding to each backlight subarea and the first frame of image area and the second frame of image area of the backlight subarea adjacent to a first direction of the backlight subarea.

17. The method according to claim 11, wherein the adjustment parameter is determined according to the drive voltages of a first frame of image area and a second frame of image area corresponding to each backlight subarea and the first frame of image area and the second frame of image area of the backlight subarea adjacent to a second direction of the backlight subarea.

18. The method according to claim 11, wherein the adjustment parameter is determined according to the drive voltages of a first frame of image area and a second frame of image area corresponding to each backlight subarea and the first frame of image area and the second frame of image area of the backlight subarea adjacent to a third direction of the backlight subarea.

19. The method according to claim 11, wherein the adjustment parameter is determined according to the drive voltages of a first frame of image area and a second frame of image area corresponding to each backlight subarea and the first frame of image area and the second frame of image area of the backlight subarea adjacent to a fourth direction of the backlight subarea.

20. The method according to claim 11, wherein the adjustment parameter is determined according to the drive voltages of a first frame of image area corresponding to each backlight subarea and the first frame of image area of the backlight subarea adjacent to a fourth direction of the backlight subarea.

* * * * *